US009075996B2

(12) United States Patent
Harris et al.

(10) Patent No.: US 9,075,996 B2
(45) Date of Patent: Jul. 7, 2015

(54) EVALUATING A SECURITY STACK IN RESPONSE TO A REQUEST TO ACCESS A SERVICE

(75) Inventors: Timothy E. Harris, Lafayette, CO (US); Jeremy E. Cath, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/561,511

(22) Filed: Jul. 30, 2012

(65) Prior Publication Data
US 2014/0033272 A1 Jan. 30, 2014

(51) Int. Cl.
*H04L 29/06* (2006.01)
*G06F 21/00* (2013.01)
*G06F 21/57* (2013.01)

(52) U.S. Cl.
CPC ........ *G06F 21/577* (2013.01); *G06F 2221/034* (2013.01); *H04L 63/1433* (2013.01)

(58) Field of Classification Search
CPC ......... H04L 63/14; H04L 63/10; H04L 63/20; G06F 21/577; G06F 21/55; G06F 21/50; G06F 21/60
See application file for complete search history.

(56) References Cited

U.S. PATENT DOCUMENTS

| 8,006,100 | B2 | 8/2011 | King et al. | |
|---|---|---|---|---|
| 2003/0055994 | A1* | 3/2003 | Herrmann et al. | 709/229 |
| 2004/0010700 | A1* | 1/2004 | Mont | 713/189 |
| 2007/0143629 | A1* | 6/2007 | Hardjono et al. | 713/189 |
| 2008/0022129 | A1 | 1/2008 | Durham et al. | |
| 2008/0046752 | A1 | 2/2008 | Berger et al. | |
| 2009/0313373 | A1* | 12/2009 | Hanna et al. | 709/225 |
| 2011/0179477 | A1 | 7/2011 | Starnes et al. | |

OTHER PUBLICATIONS

"Research for Advancing Trusted Computing", Retrieved at <<http://domino.research.ibm.com/comm/research.nsf/pages/r.security.innovation.html>> May 3, 2008, p. 2.
Dietrich, et al., "A Practical Approach for Establishing Trust Relationships between Remote Platforms using Trusted Computing", Retrieved at <<https://pervasive.uni-klu.ac.at/publications/pdf/2007--dietrich.pdf>> Nov. 2007, pp. 156-168.
(Continued)

*Primary Examiner* — Izunna Okeke
(74) *Attorney, Agent, or Firm* — Julie Kane Akhter; Sade Fashokun; Micky Minhas

(57) ABSTRACT

A process to evaluate a request to access a service received from a user's computing device having a software stack and a software stack provider over a computer network is disclosed. Prior to providing access to the service, a determination is made as to whether the software stack meets a set of conditions. If the set of conditions are met, the software stack provides verification information. The software stack provider is asked to validate the verification information. Access to the service if the software stack provider validates that the set of conditions are met.

19 Claims, 4 Drawing Sheets

(56) References Cited

OTHER PUBLICATIONS

Shankar, et al., "Side effects are not sufficient to authenticate software", Retrieved at <<http://static.usenix.org/publications/library/proceedings/sec04/tech/full_papers/shankar/shankar.pdf>> Proceedings of the 13th conference on USENIX Security Symposium, Aug. 9, 2004, pp. 89-102.

Kil, et al., "Remote Attestation to Dynamic System Properties: Towards Providing Complete System Integrity Evidence", retrieved at <<http://ieeexplore.ieee.org/stamp/stamp.jsp?tp=&arnumber=5270348>> International Conference on Dependable Systems & Networks, 2009. DSN '09. IEEE/IFIP, Jun. 29, 2009, pp. 115-124.

\* cited by examiner

EVALUATING A SECURITY STACK IN RESPONSE TO A REQUEST TO ACCESS A SERVICE

BACKGROUND

Several mechanisms exist to verify that a computer system or system user can be trusted with sensitive information or data that a user desires to keep confidential. Computers running on a network are often used to perform sensitive tasks such as transferring money between users, accessing confidential information stored elsewhere, communicating with selected other users, and other actions where a user may desire to keep certain details confidential. Mechanisms used to verify whether a particular user can be trusted to perform an action include passwords, tokens, fingerprints, and the like. Mechanisms used to verify whether a system can to be trusted, or the degree to which it can be trusted, include certificates, Trusted Platform Module, and the like.

Despite these security measures, computer systems are still vulnerable to hackers and cyber thieves. For example, a cyber-thief or other imposter can install malicious programs, or malware, on an unsuspecting system, such as a keylogger, Trojan, proxy, or other malware that can compromise the security of the login or a transaction after login. Malware can be launched and controlled from a remote computer and can be nearly undetectable to an unsuspecting user without special software. In such cases, secure accounts or services become vulnerable to malicious programs that can exploit old or insecure program interfaces or otherwise compromise a computing device. Security programs such as antivirus software can detect and remove malicious programs if the security programs are kept up to date and regularly used.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Many examples exist where a user may want to securely access or manipulate sensitive information on a service over a computer network such as performing online banking transactions, adding to medical records in a hospital, or editing personal profile on a social media site. The user is often asked to log in to the service, which is an example of how the service attempts to verify that the user can be trusted to perform actions with the service account. Additionally, systems such as certificates can be used to verify whether a particular machine is considered trustworthy such as whether the machine is a corporate asset. Difficulties arise, however, in determining whether an apparent trusted user on a trusted machine can create a security vulnerability from running insecure or exploited software interfaces or otherwise compromised computing device.

This disclosure is directed to a process to evaluate a request to access a service, such as an attempt to interface with the service, received from a user having a software stack on a computing device coupled together on a network with a software stack provider. The software stack can include a security program or an antivirus program to protect the user from malicious code. When the user requests access to the service, a determination is made as to whether the software stack on the user's computing device claims to meet a set of conditions set by the service. The set of conditions can include having a particular software stack, having a recent virus definition update to the software stack, having performed a virus scan with an elected virus definition. If the computing device claims to meet the set of conditions, the software stack delivers verification information to permit the software stack provider to validate the claim. The service allows access and can be used if the software stack provider validates that the set of conditions are met.

In one example, the service can validate a particular software stack prior to accessing or using sensitive information in the service such to determine whether a securities trader is using a valid program when placing a trade, whether a medical professional is using a correct software interface software for medical records services, or the like, which are examples of attempts to access the service. In response to a request to use the service, the service may send tags with a set of conditions for the software stack prior to allowing use of the service. In response to the tags, the software stack can send a confirmation request to the software stack provider. The software stack provider can validate the software stack by passing approval tokens to the requesting service to confirm the software stack meets the set of conditions.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
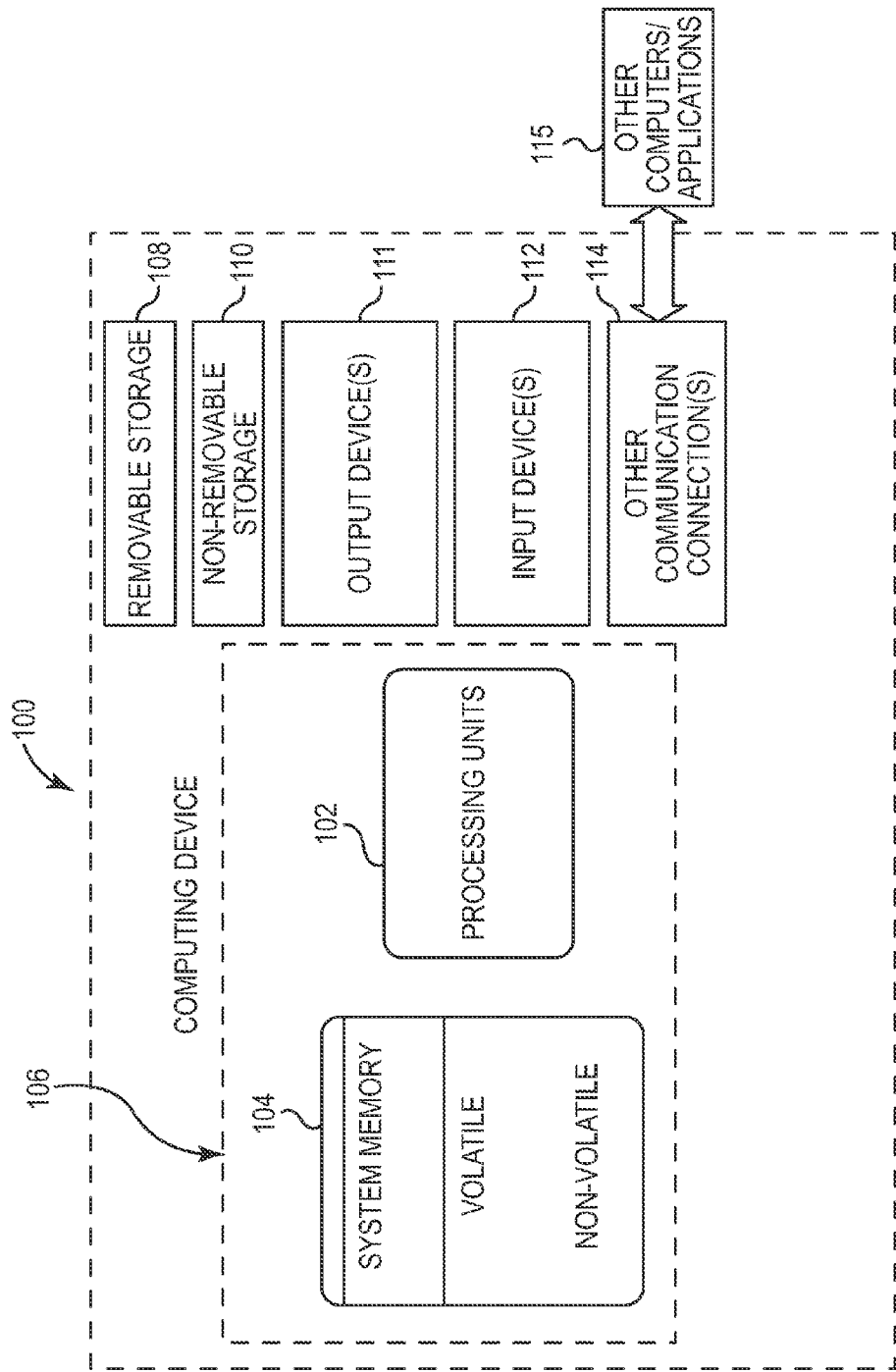
FIG. 1 is a block diagram illustrating an example of a computing device.

FIG. 1 illustrates an exemplary computer system that can be employed in an operating environment and used to host or run a computer application included on one or more computer readable storage mediums storing computer executable instructions for controlling the computer system, such as a computing device, to perform a process to evaluate a software stack in response to a request to access a service. The computer system can also be used to develop and/or run computer applications having processes to evaluate a software stack in response to a request to access a service.

The exemplary computer system includes a computing device, such as computing device 100. In a basic hardware configuration, computing device 100 typically includes a processor system having one or more processing units, i.e., processors 102, and memory 104. By way of example, the processing units may include, but are not limited to, two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device 100 can take one or more of several forms. Such forms include a tablet, a personal computer, a workstation, a server, a handheld device, a consumer electronic device (such as a video game console), or other, and can be a stand-alone device or configured as part of a computer network, computer cluster, cloud services infrastructure, or other.

Computing device 100 can also have additional features or functionality. For example, computing device 100 may also include additional storage. Such storage may be removable and/or non-removable and can include, but is not limited to, magnetic or optical disks or solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse), pen, voice input device, touch input device, or other. Output devices 111 may include devices such as a display, speakers, printer, or the like.

Computing device 100 can be configured to run an operating system software program and one or more computer applications, which make up a system platform. A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a thread identifier, and a thread context, or thread state, until the thread is scheduled. A thread context includes the thread's set of machine registers, the kernel stack, a thread environmental block, and a user stack in the address space of the process corresponding with the thread. Threads can communicate with each other during processing through techniques such as message passing.

An operation may execute in a thread separate from the main application thread. When an application calls methods to perform an operation, the application can continue executing on its thread while the method performs its task. Concurrent programming for shared-memory multiprocessors can include the ability for multiple threads to access the same data. The shared-memory model is the most commonly deployed method of multithread communication. Multiple threads execute on multiple processors, multiple processor cores, multiple logical nodes in a single processor core, and/or other classes of parallelism that are attached to a memory shared between the processors.

In one example, the computing device 100 includes a software component referred to as a managed environment. The managed environment can be included as part of the operating system or can be included later as a software download. Typically, the managed environment includes pre-coded solutions to common programming problems to aid software developers to create applications, such as software programs, to run in the managed environment. Examples of managed environments can include an application framework or platform available under the trade designation .NET Framework from Microsoft Corporation of Redmond, Wash. U.S.A., and Java now from Oracle Corporation of Redwood City, Calif., U.S.A., as well as others and can include web application frameworks often designed to support the development of dynamic websites, web applications and web services.

Computing device 100 often includes one or more communication connections 114 that allow computing device 100 to communicate with other computers/applications 115. Example communication connections can include, but are not limited to, an Ethernet interface, a wireless interface, a bus interface, a storage area network interface, a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Figure 2:
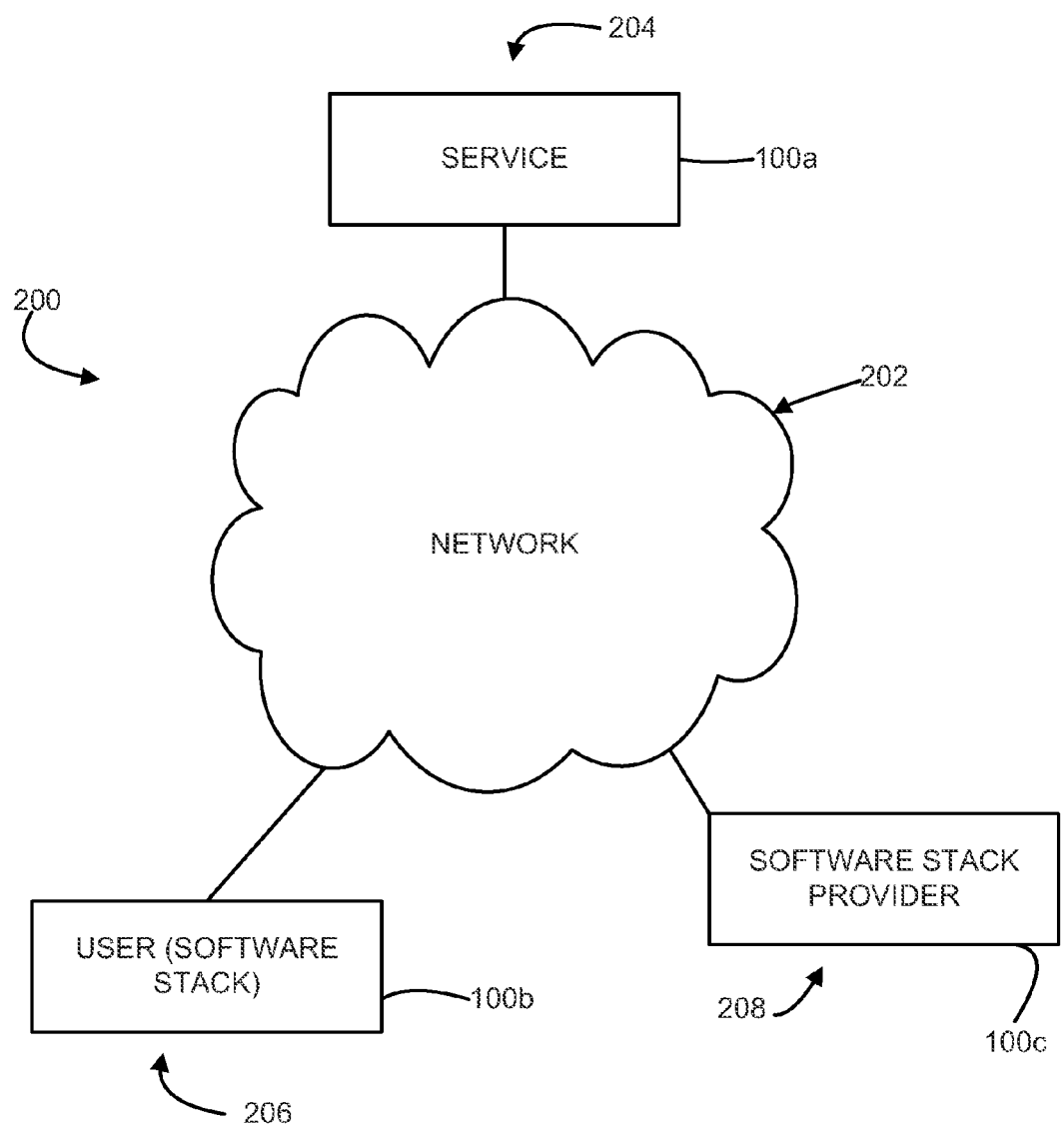
FIG. 2 is a schematic drawing illustrating a network including computing devices of FIG. 1.

FIG. 2 illustrates an example computer network 200. The computer network 200 includes a plurality of computing devices 100a, 100b, 100c coupled to a network 202, which may include one or more networks. In the illustrated example, one node includes a service 204 communicably coupled to the network 202, another node can belong to a user 206 attempting to access the service over the network 202, and another node includes a software stack provider 208 also communicably coupled to the network 202.

The service 204 can include sensitive information, so the service 204 may include a layer of protection to allow only a trusted user to obtain initial access the service. This layer of protection can be addressed, for example, if the user 206 can log in to initially access the service 204 with a particular username and password. In this respect, the service 204 attempts to verify that the user 206 can be trusted to perform actions with the service 204. Additionally, the service 204 may include a layer of protection to allow only a trusted system to access the service 204. This layer of protection can be addressed, for example, if certificates or TPM can validate the system. In this respect, the service 204 attempts to verify whether a particular machine, such as 100a or 100b, is considered trustworthy. Difficulties arise, however, in determining whether an apparent trusted user on a trusted system can create a security vulnerability from running insecure or exploited software interfaces or an otherwise compromised computing device.

In order to protect the service 204 and the user 206 from cyber-thieves or hackers who can exploit security vulnerabilities in the software interfaces or otherwise on the computing device 100b, the user 206 can install a software stack working with the operating system and including, for example, security software or antivirus software to detect malicious programs that may have been surreptitiously installed on the user's computing device 100b. A computing device having security software by itself is often not enough to protect a user. Security software is often updated to protect against the latest malicious programs. Then, the updated security software should scan the computing device to determine if it is infected with the latest malicious code since the last update.

Prior to permitting a user access, the service 204 may request verification from the user 206 that the software stack is trustworthy. (For this disclosure, the term "access" can include initial access to the service and subsequent requested interfaces with the service.) If the service has been made aware of a malicious program that may bring into question whether an attempted access with the service is a security risk, the service may seek to determine if the malicious program exists on the user's computing device 100b. In another form of this determination, the service may seek to determine whether a software stack is in place that may have protected the user's computing device 100b from the malicious program. One example of this determination can include seeking verification that the computing device 100b has an updated security program and that the computing device 100b has recently been scanned for viruses.

Prior to allowing access, the service 204 may inquire the user 206 to provide verification of adequate protection from malicious programs or verification of a trusted software stack installed on the computing device 100b. In one example, the user may download and install verification software on the computing device to work with the software stack. The verification software can be composed in a framework such ActiveX available from Microsoft, Corp., and interface with the service to determine if the software stack is trustworthy. While this solution is viable, it may not be preferred because computer users typically resist downloading additional software items and the verification software may itself provide another vector of vulnerability on the user's computing device 100b. Further, because this method can be unique to the service and not subject to any standards, a user may have to download several verification programs such as one for every service the user may wish to access.

Figure 3:
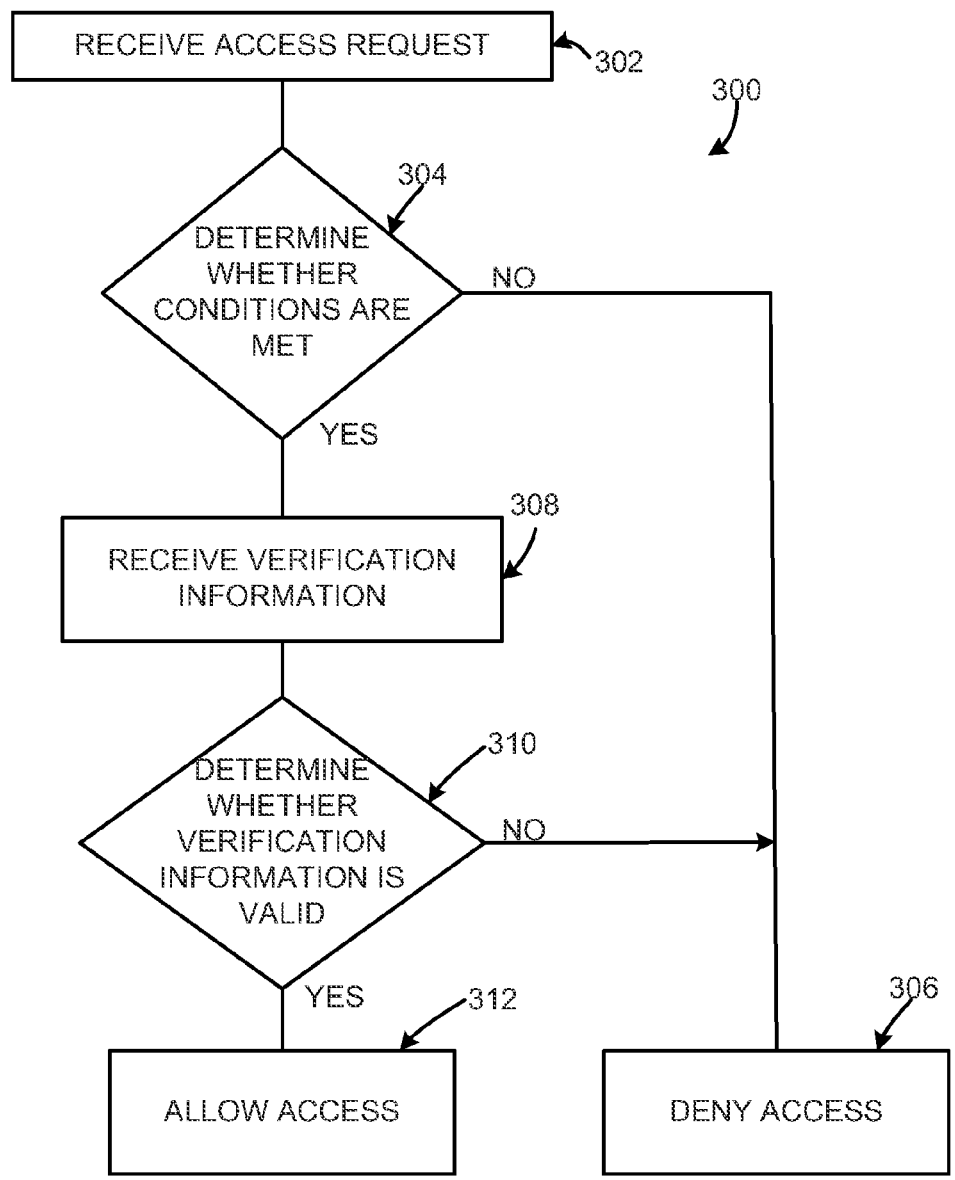
FIG. 3 is a flow diagram illustrating an example process used on the network of FIG. 2 to evaluate a request from a computing device on the network to access a service on the network.

FIG. 3 illustrates a process 300 to evaluate a request to access a service 204 received from the user's computing device 100b having a software stack with the software stack provider 208 over the computer network 202. The service 204, user's computing device 100b, and software stack provider 208 communicate over the network 200 to verify and validate the user 206 to the service 204. In response to an apparently valid request to access a service 204, such as a user 206 attempting initial access, such as attempting to log in with the correct username and password, or otherwise attempting to interface with the service in a sensitive manner, at 302, a determination is made whether the software stack has met a set of conditions prior to providing user access to the service 204 at 304. If the conditions are not met, the user is denied access to the service at 306. If the conditions are met, the inquiry continues to determine if the software stack indeed meets the conditions. For example, the software stack produces verification information at 308 that is delivered to the software stack provider for validation at 310. If the software stack provider does not validate the conditions are met, the computing device 100b is denied access to the service at 304. If the software stack provider does validate the conditions are met, the computing device 100b is permitted access to the service at 312.

In an example implementation, the software stack is registered into one or more software categories on the user's computing device 100b when installed. Notice of the installation can be delivered over the network 200 to the software stack provider 208. The software stack can include an address or Universal Resource Indicator (URI), which can be termed a registration URI, of the software stack provider as part of the verification information. The software stack can be configured to detect a request for verification from the service 204 such as to hook an event on computing device 100b. In one example, communications over the network occur via Hypertext Transfer Protocol Secure (HTTPS), such as Hypertext Transfer Protocol (HTTP) over Secure Sockets Layer (SSL) or Transport Layer Security (TLS). In addition, the service 204, user 206, and software stack provider can validate any certificates with a registered certificate authority.

In an example, the service 204 can respond to a request for access with a set of tags that set forth the set of conditions for access to be granted. These conditions can be related to software stack itself, the version installed on computing device 100b, or other conditions and combinations of these conditions. For example, a set of conditions may be that computing device 100b have installed version 10.1 of antivirus software brand named XYZ with virus updates less than four weeks old. Another set of conditions may be that computing device 100b includes antivirus software with a virus update that is less than three months old. Still another set of conditions may be that computing device has one of twelve different acceptable antivirus software programs, the first with a virus definition less than three weeks old, the second with a virus definition less than one month old, etc. Further, a set of conditions for the purposes of this disclosure can include a single condition.

The service 204 can determine the conditions to be satisfied prior to permitting access. Different services can determine different sets of conditions to be met. The conditions may be based on known malicious programs or just on secure computing in general. For example, the service may be aware of certain malicious programs and can provide access to those computing devices 100b that have a software stack to protect against these malicious programs, or the service may not be aware of any recent malicious programs but will provide access to those computing devices 100b running security software. If the known malicious programs can be determined with earlier versions of the security software, the set of conditions may not require use of the most up to date versions of the security software.

Software, or the like, on the computing device 100*b* can interpret the set of tags and send a response over the network 202 to the service 204 as to which conditions the software stack claims to meet. For example, an HTTP stack, a trusted proxy, a web browser, or the like installed on computing device 100*b* can be used to interpret the tags. In one example, the computing device 100*b* will respond to the service with verification information such as which of the set of conditions are claimed as met and the registration URI. If the conditions are not met or the registration URI is not acceptable to the service, the service can deny access to the computing device 100*b*. In some instances, the service can provide a notification as to why access was denied. If the conditions are met, the service can deliver a session identifier and a listener address, such as a listener URI to allow communication with the service, to the computing device 100*b* to maintain and to pass to the software stack provider 208.

In one example, computing device 100*b* (through an HTTP stack, trusted proxy, web browser, or the like) can issue or fire an event including the listener URI. Software on computing device 100*b* can contact the software stack provider 208 on the registered URI, pass the listener URI to the software stack provider 208 along with the session identifier, and request validation of the verification information. In another example, the service 204 can contact the software stack provider 208 directly with the verification information received from the user 206 to request validation.

The software stack provider 208 can interrogate the software stack on computing device 100*b*. This interrogation can occur in a secure manner and may even periodically change, such as after a new virus definition is available. In one example, the interrogation of the computing device 100*b* occurs in response to the log in session, an attempted transaction, or other chosen interface with the service. The software stack provider 208 will identify the components of the software stack running on computing device 100*b*, and then contact the service 204, such as on the listener URI. The software stack provider 208 can provide validation information to service 204 such as the results of the interrogation. The service can use the validation information for the session identifier in question to determine whether to grant the user 204 access to the service at 312 or deny access at 306.

Figure 4:
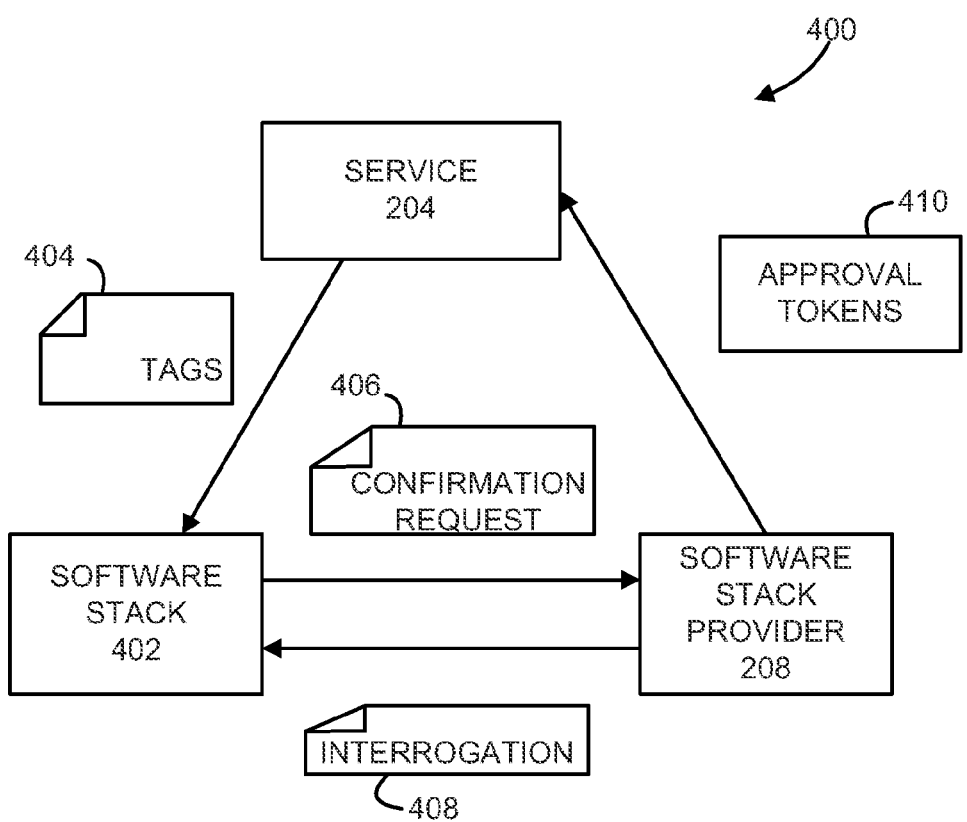
FIG. 4 is a schematic diagram illustrating an example implementation of the process of FIG. 3 on the network of FIG. 2.

FIG. 4 illustrates an example implementation 400 of the process 300. In this example, the service 204 can validate a particular software stack 402 (such as the software stack on computing device 100*b* in FIG. 2) prior to accessing or using sensitive information on the service to determine if there is a security risk. Examples can include determining whether a securities trader is using a valid program when placing a trade, whether a medical professional is using a correct software interface software for medical records services, whether malicious code is involved when a correct username and password are supplied to initially access a secure account, or the like. In response to a request to access the service, the service 204 may send tags 404 with a set of conditions to the software stack 402 prior to allowing use of the service 204. In response to the tags 404, the software stack 402 can send a confirmation request 406 to the software stack provider 208 over the network 202. In one example, the software stack provider 208 interrogates 408 the software stack 402. The software stack provider 208 can validate the software stack on the computing device 100*b* by passing approval tokens 410 to the requesting service 204 to validate the software stack 402 meets the set of conditions. If the conditions are validated, the computing device 100*b* can access the service.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A process to evaluate a request to access a service received from a computing device having a software stack and including a software stack provider over a network, the process comprising:
   determining from the computing device whether a set of conditions are met with the software stack prior to providing access to the service by sending tags including the set of conditions to be met and receiving a response to the tags, wherein different services respond to the request to access the service with corresponding tags that include different sets of conditions to be met by the corresponding software stack;
   receiving verification information from the software stack if the set of conditions are claimed to be met;
   requesting validation from the software stack provider using the verification information from the software stack if the set of conditions are claimed to be met with the software stack; and
   providing access to the service to securely access or manipulate sensitive information on the service over the network if the software stack provider validates the set of conditions are met.

2. The process of claim 1 wherein the service determines whether user claims to meets the set of conditions and whether the software stack provider validates the set of conditions are met.

3. The process of claim 1 wherein determining from the computing device whether the set of conditions are claimed to be met is in response to a request to access the service.

4. The process of claim 3 wherein the request to access the service is an interface with the service after log in.

5. The process of claim 1 wherein interactions between the service, the computing device, and the software stack provider occur via Hypertext Transfer Protocol Secure.

6. The process of claim 5 wherein the service, the computing device, and the software stack provider can validate certificates with a certificate authority.

7. The process of claim 1 wherein notice of installation of the software stack is delivered to the software stack provider prior to the request to access the service.

8. Original) The process of claim 1 wherein software stack includes an address of the software stack provider.

9. The process of claim 8 wherein the verification information includes the address and the set of conditions the software stack claims to meet.

10. The process of claim 9 wherein the request to access is denied if one of the address and the set of conditions the software stack claims to meet is unacceptable to the service.

11. The process of claim 1 wherein the software stack provider responds to the request for validation by interrogating the software stack.

12. The process of claim 11 wherein the software stack provider notifies the service as to whether the conditions are met can be validated.

13. A process to evaluate a request to access a service received from a computing device having a software stack and including a software stack provider over a network, the process comprising:
- in response to the request from the computing device to access the service, determining whether the software stack meets a set of conditions by sending tags including the set of conditions to be met and receiving a response to the tags, wherein different services respond to the request to access the service with corresponding tags that include different sets of conditions to be met by the corresponding software stack;
- if the software stack meets the set of conditions, receiving verification information from the software stack including the set of conditions the software stack claims to meet and an address of the software stack provider;
- requesting the software stack provider at the address determine to validate the verification information; and
- providing computing device access to the service to securely access or manipulate sensitive information on the service over the network if the software stack provider validates the verification information.

14. The process of claim 13 and further comprising denying access to the service if the software stack fails to meet the set of conditions or if the software stack provider fails to validate the verification information.

15. The process of claim 13 wherein tags are interpreted by one of a group consisting of a Hypertext Transfer Protocol stack, a trusted proxy, and a web browser.

16. The process of claim 13 wherein the software stack delivers the verification information to the software stack provider.

17. The process of claim 16 wherein the software stack further delivers to the software stack provider a listener address and a session identifier received from the service.

18. A process to evaluate a request from a user's computing device to access a service, wherein the user's computing device includes a security software stack and including a software stack provider over a network, the process comprising:
- in response to the request to access the service, providing a set of tags to be interpreted by the user's computing device to determine whether the security software stack meets a set of conditions of the service, wherein different services respond to the request to access the service with corresponding tags that include different sets of conditions to be met by the corresponding security software stack;
- receiving a response to the tags from the user's computing device, the response including verification information if the set of conditions are claimed to be met, wherein verification information includes the set of conditions claimed to be met and an address of the software stack provider;
- responding to the verification information by including a listener address of the service to be delivered to the software stack provider;
- requesting validation of the verification information from the software stack provider if the set of conditions are met wherein validation includes the software stack provider interrogating the software stack to determine whether the conditions are met and providing results of the validation to the service over the listener address; and
- providing access to the service to securely access or manipulate sensitive information on the service over the network if the software stack provider validates the set of conditions are met.

19. The process of claim 18 wherein the responding to the verification information by further including a session identifier for the user request to access the service.

* * * * *